(12) United States Patent
Horie

(10) Patent No.: US 10,599,998 B2
(45) Date of Patent: Mar. 24, 2020

(54) FEATURE SELECTION USING A LARGE DEVIATION PRINCIPLE

(71) Applicant: YAHOO JAPAN CORPORATION, Tokyo (JP)

(72) Inventor: Shinkichi Horie, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 878 days.

(21) Appl. No.: 15/250,131

(22) Filed: Aug. 29, 2016

(65) Prior Publication Data

US 2017/0178029 A1    Jun. 22, 2017

(30) Foreign Application Priority Data

Dec. 18, 2015    (JP) .................. 2015-247394

(51) Int. Cl.
*G06N 20/00*    (2019.01)
(52) U.S. Cl.
CPC .................. *G06N 20/00* (2019.01)
(58) Field of Classification Search
None
See application file for complete search history.

(56) References Cited

U.S. PATENT DOCUMENTS

2015/0278710 A1* 10/2015 Hisada .................. G06N 20/00
706/12

FOREIGN PATENT DOCUMENTS

JP    2015-001968 A    1/2015

OTHER PUBLICATIONS

Janecek, Andreas G. K. et al.; A Comparison of Classification Accuracy Achieved with Wrappers, Filters and PCA; 2008; Workshop on New Challenges for Feature Selection in Data Mining and Knowledge; pp. 1-12. (Year: 2008).*
Gheyas, Iffat A. et al.; Feature subset selection in large dimensionality domains; Elsevier; Pattern Recognition 43 (2010) 5-13. (Year: 2010).*
Janecek, Andreas G. K. et al.; On the Relationship Between Feature Selection and Classification Accuracy; 2008; JMLR: Workshop and Conference Proceedings 4: 90-105. (Year: 2008).*
Fan, Jianqing et al.; Statistical Challenges with High Dimensionality: Feature Selection in Knowledge Discovery; 2006; pp. 1-27. (Year: 2006).*
Feb. 6, 2018 Office Action issued in Japanese Patent Application No. 2015-247394.
T. Chiyonobu., "Large Deviation Principle and Mathematical Physics/ Varadhan", Mathematical Sciences No. 546., 2008.

* cited by examiner

*Primary Examiner* — Stanley K. Hill
(74) *Attorney, Agent, or Firm* — Oliff PLC

(57) ABSTRACT

A learning device includes a classification unit that classifies data to be determined by using a learner configured to classify data based on a predetermined feature among features included in the data. The learning device includes an estimation unit that estimates, from classification results according to the classification unit, the behavior of the probability of a mistake occurring in the classification results according to the classification unit based on a large deviation principle. The learning device includes a determination unit that determines, based on the behavior estimated by the estimation unit, whether to add a new feature to an object to be learned for the learner.

8 Claims, 6 Drawing Sheets

FIG.3

| | USER a | USER b | USER c | USER d | ... |
|---|---|---|---|---|---|
| FEATURE #1 | a1 | b1 | c1 | d1 | ... |
| FEATURE #2 | a2 | b2 | c2 | d2 | ... |

FIG.4

| | USER A | USER B | USER C | USER D | ... |
|---|---|---|---|---|---|
| FEATURE #1 | A1 | B1 | C1 | D1 | ... |
| FEATURE #2 | A2 | B2 | C2 | D2 | ... |
| FEATURE #3 | A3 | B3 | C3 | D3 | ... |
| ... | ... | ... | ... | ... | ... |

|  | USER A | USER B | USER C | USER D | ... |
|---|---|---|---|---|---|
| CLASSIFICATION RESULT | G1 | G1 | G1 | G2 | ... |
| CORRECTNESS | CORRECT | CORRECT | INCORRECT | INCORRECT | ... |

FEATURE SELECTION USING A LARGE DEVIATION PRINCIPLE

CROSS-REFERENCE TO RELATED APPLICATIONS

The present application claims priority to and incorporates by reference the entire contents of Japanese Patent Application No. 2015-247394 filed in Japan on Dec. 18, 2015.

BACKGROUND OF THE INVENTION

1. Field of the Invention

The present invention relates to a learning device, a learning method, and a non-transitory computer readable storage medium.

2. Description of the Related Art

In the past, a technique for machine learning has been known in which a characteristic included in data is learned in advance and data to be determined is classified based on a learning result. As an example of such a technique, a technique has been known in which, among a plurality of features included in data to be learned, a characteristic of a feature specified in advance is learned and, based on the characteristic of the feature included in data to be determined, the data is classified.

Patent Document 1: Japanese Laid-open Patent Publication No. 2015-001968

However, the classification accuracy of the data cannot be enhanced in some cases. For example, even when a feature useful for the classification of the data is present in addition to the feature specified in advance, the aforementioned technique cannot enhance the classification accuracy of the data in a case where a characteristic of that feature has not been learned.

SUMMARY OF THE INVENTION

It is an object of the present invention to at least partially solve the problems in the conventional technology.

According to one aspect of an embodiment a learning device includes a classification unit that classifies data to be determined by using a learner configured to classify data based on a predetermined feature among features included in the data. The learning device includes an estimation unit that estimates, from classification results according to the classification unit, the behavior of the probability of a mistake occurring in the classification results according to the classification unit based on a large deviation principle. The learning device includes a determination unit that determines, based on the behavior estimated by the estimation unit, whether to add a new feature to an object to be learned for the learner.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of information registered in a learning information database according to the embodiment;

FIG. 4 is a diagram illustrating an example of information to be registered to an object information database according to the embodiment;

DETAILED DESCRIPTION OF THE PREFERRED EMBODIMENTS

Figure 1:
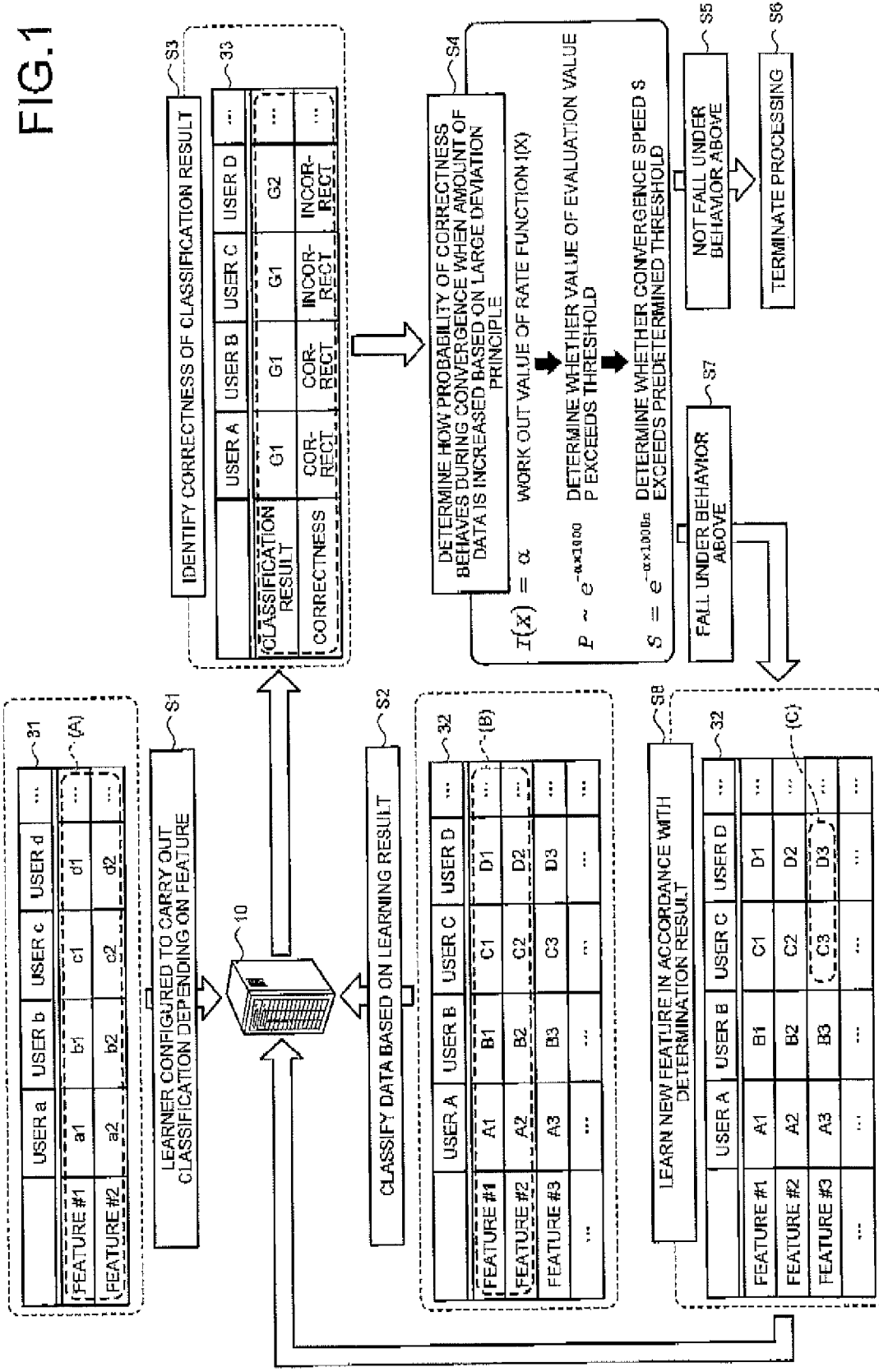
FIG. 1 is a diagram illustrating an example of a learning device according to an embodiment.

Hereinafter, modes for carrying out a learning device, a learning method, and a non-transitory computer readable storage medium according to the present application (hereinafter, referred to as "embodiments") will be described in detail with reference to the drawings. These embodiments should not be construed to limit the learning device, the learning method, and the non-transitory computer readable storage medium according to the present application. In the respective embodiments below, the same constituent members are denoted with the same reference numerals and the duplicated description will be omitted.

1. Example of Processing Carried Out by Learning Device

First, an example of a learning device 10 will be described with reference to FIG. 1. FIG. 1 is a diagram illustrating an example of the learning device according to an embodiment. As examples of processing carried out by the learning device 10, FIG. 1 has noted an example of learning processing in which a learner configured to classify a user is learned and an example of classification processing in which the user is classified based on a learning result.

For example, the learning device 10 includes a learning information database 31 in which learning data including a feature serving as information indicating an attribute that the user has is registered as correct data (that is, positive example data). Such learning data includes a feature indicating a physical attribute of each user such as sex, age, height, or weight and a social attribute of each user such as educational background, occupation, income, address, or family structure. The learning data may include a feature indicating a preference and an idea such as favorite food or a frequently viewed web page and a feature indicating a possession such as a model of an owned car. Accordingly, the learning data is assumed to include, as features, information indicating certain information relating to the user to be classified as well as the attribute of the user.

The learning device 10 uses such learning data to learn the learner for classifying the user. More specifically, the learning device 10 sets a predetermined feature included in the learning data as an object to be learned and learns a point in common, a characteristic, and the like included in the object to be learned, thereby learning the learner configured to classify the user depending on the feature set as the object to be learned (step S1). For example, the learning data includes a feature #1 indicating the sex of users a to d who "like driving" and a feature #2 indicating the income of the users a to d.

In such a case, as illustrated in (A) in FIG. 1, the learning device 10 learns characteristics such as the commonality among the features #1 "a1" to "d1" and the features #2 "a2" to "d2" of the users a to d, respectively, thereby learning the learner indicating the characteristics found in the features #1 and the features #2 of the users who "like driving". The example illustrated in FIG. 1 has noted an example where the feature #1 and the feature #2 are included in the learning data. However, the arbitrary number of features can be additionally included in the learning data, for example, a feature #3 and a feature #4.

Subsequently, based on a learning result, the learning device 10 carries out the classification processing in which the user is classified. For example, the learning device 10 includes an object information database 32 in which data to be determined is registered. The data to be determined includes various types of features #1 to #3 regarding users A to D to be classified. The example illustrated in FIG. 1 has noted an example where the features #1 to #3 are included in the data to be determined. However, the arbitrary number of features can be additionally included in the data to be determined. While storing such data to be determined, the learning device 10 classifies the data to be determined based on the learning result (step S2).

For example, as illustrated in (B) in FIG. 1, the learning device 10 compares, with the characteristics indicated by the learner, characteristics found in the features #1 "A1" to "D1" and the features #2 "A2" to "D2" regarding the users A to D, respectively, included in the data to be determined, and then classifies the respective users A to D with respect to whether the users "like driving" or "do not like driving" based on comparison results. For example, when the characteristics found in the feature #1 "A1" and the feature #2 "A2" of the user A are common to the characteristics indicated by the learner, the learning device 10 determines that the user A "likes driving". On the other hand, when the characteristics found in the feature #1 "C1" and the feature #2 "C2" of the user C are not common to the characteristics indicated by the learner, the learning device 10 determines that the user C "does not like driving".

As described above, the learning device 10 uses the characteristic found in the feature included in the learning data to generate the learner configured to classify the user. Thereafter, the learning device 10 classifies the user based on the generated learner and the characteristic found in the feature regarding each of the users.

Here, the learning device 10 learns the characteristic found in the feature designed in advance by an administrator managing the learning device 10. For example, when the administrator determines that the feature #1 and the feature #2 relating to the sex and the income are important for the classification based on whether the user "likes driving" but the feature #3 relating to the age is not important therefor, the learning device 10 learns the characteristics of the feature #1 and the feature #2 regarding the users a to d but does not learn the characteristic of the feature #3.

However, in a case where the feature #3 indicating attributes relating to the age of the users A to D are an important feature when the users A to D are classified based on whether the users A to D "like driving", that is, in a case where the feature #3 acts as a hidden element, it is considered that the classification accuracy is not so high. Meanwhile, when all of the features are learned in advance for the purpose of the enhancement of the classification accuracy, the characteristic of a feature not important for the classification is consequently learned as well, causing an unnecessary processing cost.

For a solution to this, the learning device 10 carries out the following determination processing. First, the learning device 10 identifies whether the classification result of the data to be determined is correct (step S3). Thereafter, the learning device 10 uses a large deviation principle to estimate, based on the actual classification results, the behavior of the probability of a mistake occurring in the classification results when the number of the users to be determined is increased and then determines whether to add a new feature to the learning result based on an estimation result (step S4).

The following will specifically describe the processing carried out by the learning device 10 to estimate, from the actual classification results, the behavior of the probability of a mistake occurring in the classification results by using the large deviation principle. For example, the classification results according to the learner are considered to include a mistake due to a difference between a learning model and an actual measurement environment. It is desirable that the probability of the occurrence of such a mistake fall within a margin of error allowable for the learner.

Accordingly, the learning device 10 uses the large deviation principle to calculate a value for evaluating the convergence of the probability of a mistake which occurs in the classification results occurring within a predetermined margin when the amount of observation data is increased (hereinafter, noted as evaluation value P). For example, the learning device 10 generates a function indicating a probability distribution of the occurrence of mistake based on a percentage of mistakes included in the actual classification results and then calculates a rate function I(x) serving as Legendre transformation of the generated function.

Thereafter, the learning device 10 uses the rate function I(x) that has been worked out to calculate a value of the evaluation value P serving as the probability of a mistake occurring at a predetermined probability or higher. The learning device 10 also calculates a value of a convergence speed S indicating a speed at which the probability distribution function converges to "zero".

Here, when the value of the evaluation value P exceeds a predetermined threshold and the convergence speed is equal to or lower than a threshold, this situation is considered to be a phenomenon occurring due to the large deviation rather than a mistake caused by an error. In such a case, once a hidden feature that should be set as an object to be learned for the learner is added to the object to be learned, the classification accuracy of the learner is expected to be further enhanced.

As described above, the values of the evaluation value P and the convergence speed S can function as indicators for whether the classification accuracy of the learner can be enhanced, that is, whether there is a hidden feature that enhances the classification accuracy of the learner. Accordingly, the learning device 10 determines whether to add a new feature to the object to be learned depending on the value of the evaluation value P and the value of the convergence speed S.

For example, when the behavior of the evaluation value P and the convergence speed S does not fall under predetermined behavior (step S5) such as a case where the value of the evaluation value P is equal to or smaller than the predetermined threshold or a case where the value of the convergence speed S exceeds the predetermined threshold, the learning device 10 determines that the classification accuracy according to the learner is sufficient and terminates the processing (step S6). On the other hand, when the behavior of the evaluation value P and the convergence speed S falls under the predetermined behavior (step S7) such as a case where the value of the evaluation value P exceeds the predetermined threshold and the value of the convergence speed S is equal to or smaller than the predetermined threshold, the learning device 10 determines that an accuracy of the classification of the learner can be enhanced by adding a new feature to the object to be learned and adds a new feature to the object to be learned (step S8).

To give a specific example, the learning device 10 extracts the data to be determined with respect to users for which the classification results have been mistakes and, among the features included in the extracted data to be determined, identifies a feature not set as the object to be learned and common among the users for which the classification results have been mistakes. For example, as illustrated in (C) in FIG. 1, when the feature #3 "C3" of the user C and the feature #3 "D3" of the user D are features common or similar to each other, the learning device 10 adds the features #3 of the user C and the user D to the object to be learned. Thereafter, the learning device 10 causes the learner to learn the characteristics of the features #3 of the user c and the user D in addition to the features #1 and the features #2 of the users a to d.

Additionally, when the learner has been caused to newly learn the characteristics of the features #3, the learning device 10 classifies the data to be determined one more time by using the learner. Furthermore, the learning device 10 identifies the correctness of the classification results obtained through the classification carried out one more time and uses the large deviation principle to estimate the behavior of the probability of the occurrence of mistake one more time. Thereafter, depending on the estimation result obtained one more time, the learning device 10 determines whether to add a new feature to the object to be learned in order to further enhance the classification accuracy and, when the classification accuracy can be further enhanced, adds a new feature to the object to be learned.

As described above, the learning device 10 uses the large deviation principle to estimate, from the actual classification results, the behavior of the probability of a mistake occurring in the classification results when the number of the classification results is increased. Specifically, the learning device 10 calculates the evaluation value P and the convergence speed S that evaluate the convergence of the probability distribution function and, based on the values of the evaluation value P and the convergence speed S that have been worked out, determines whether the behavior in the large deviation is due to a lack of the features.

Thereafter, based on the estimated behavior, the learning device 10 determines whether to add a new feature to the object to be learned. Accordingly, even when the feature serving as the object to be learned has not accurately designed, the learning device 10 can enhance the classification accuracy in a bootstrap manner. In addition, when a value of a convergence value approaches the predetermined threshold, the learning device 10 stops the learner configured to carry out the classification from learning, whereby so-called over-learning can be prevented.

2. About Processing Based on Large Deviation Principle

Here, an example of the large deviation principle used by the learning device 10 will be described. With respect to a probability law present in a certain series of random variables $S_n/n$, while a central limit theorem indicates a deviation on the order of $1/n^{(1/2)}$, the large deviation principle can consider asymptotic behavior of the probability law when a deviation on the order of one is examined. More specifically, the large deviation principle can formulate a speed of the exponential convergence when the convergence of the probability law in the random variables is regarded as the exponential convergence. For an example, a proof, and so forth of the large deviation principle, refer to, for example, "Large Deviation Principle and Mathematical Physics/Varadhan", Taizo Chiyonobu, Mathematical Sciences No. 546, December 2008, and page five in the Mathematical Sciences No. 02, 1995.

For example, when a probability distribution of a random variable A is assumed as $P_n(A)$, the large deviation principle serves as a question for finding a rate function x indicated by following formula (1)

$$\frac{1}{n}\log P_n(A) \sim -K( \Leftrightarrow P_n(A) \sim e^{-nk}) \tag{1}$$

More specifically, the learning device 10 transforms a function indicating a distribution of mistakes included in the actual classification results into an exponential function in an asymptotic format and carries out dual transformation into a measure space. Thereafter, the learning device 10 derives the rate function serving as a functional for finding a distance between two functions having a duality relationship, thereby working out the rate function. The learning device 10 then evaluates, based on a value of the rate function, the convergence of the probability distribution function for the probability of a mistake being included in the classification results at a predetermined probability or higher and, based on an evaluation result, determines whether to add a new feature to the object to be learned.

The following will describe an example of the processing carried out by the learning device 10 to determine whether to add a new feature to the object to be learned by using the large deviation principle (Cramer's method). For example, data elements $X_1$ to $X_n$ indicated by following formula (2) will be considered. In addition, an exemplary case in which formula (14) described later is assumed as a measurability function is used.

$$X_i, i=1,2,\ldots,n \tag{2}$$

Here, values of the data elements $X_1$ to $X_n$ are assumed to correspond to the correctness of the classification results. For example, the values of the data elements $X_1$ to $X_n$ are assumed to be set in such a manner that "0" is given when an associated classification result is correct, whereas "1" is given when an associated classification result is a mistake. Under the assumption as described above, it is assumed that one learner carries out incorrect classification at a probability of one 340th. Specifically, a mistake is assumed to have occurred at a probability of one 340th in the actual classification results. In such a case, a probability distribution P of the classification results can be expressed by following formula (3).

$$P(X_i = 0) = \frac{339}{340}, P(X_i = 1) = \frac{1}{340}, i = 1, 2, \ldots, n \tag{3}$$

In addition, the number of mistakes included in n number of the classification results is obtained as S, in following formula (4).

$$S_n = X_1 + X_2 + \ldots + X_n \tag{4}$$

In such a case, when a limit $c(\lambda)$ expressed by following formula (5) is considered, the rate function $I(x)$ serving as Legendre transformation of the limit $c(\lambda)$ can be expressed by following formula (6).

$$c(\lambda) := \lim_{n \to \infty} \frac{1}{n} \log E(e^{\lambda S_n}) = \log \frac{1}{340}(339 + e^\lambda) \qquad (5)$$

$$I(x) := \sup_{\lambda \in R}\{\lambda x - c(\lambda)\}, x \in R \qquad (6)$$

Here, when $\lambda$ satisfying following formula (7) is worked out by taking advantage of the rate function which is a convex function, a value of $\lambda$ can be indicated by following formula (8).

$$\frac{\partial I(x)}{\partial \lambda} = 0 \qquad (7)$$

$$\lambda = \log \frac{339x}{1-x} \qquad (8)$$

Here, when the value of $\lambda$ indicated in formula (8) is substituted into formula (6), the rate function $I(x)$ can be expressed by following formula (9).

$$I(x) = x\log\frac{339x}{1-x} - c(\lambda) = x\log(339x) - x\log(1-x) - \log\frac{339}{340(1-x)} \qquad (9)$$

As a result, the rate function $I(x)$ can be expressed by following formula (10).

$$I(x) = \begin{cases} x\log(339x) - x\log(1-x) - \log\frac{339}{340(1-x)} & x \in (0, 1) \\ \infty & x \in [0, 1]^c \end{cases} \qquad (10)$$

Here, the convergence of the probability distribution function in which the probability of a mistake appearing among 1000 classification results is one hundredth or higher is evaluated with following formula (11). Here, a value x is assumed to satisfy $x \in [1/100, 1]$ in formula (11).

$$\inf_{x \in [\frac{1}{100}, 1]} I(x) = I\left(\frac{1}{100}\right) = 0.005204 \qquad (11)$$

As a result, the convergence of the probability distribution function in which the probability of a mistake appearing among 1000 classification results is one hundredth or higher is evaluated with a value of the evaluation value P expressed by following formula (12).

$$P\left(\frac{S_{1000}}{1000} \in \left[\frac{1}{100}, 1\right]\right) \sim e^{-0.005204 \times 1000} = 0.005495 \qquad (12)$$

In addition, a speed at which the probability distribution function converges to "zero" is evaluated with a value of the convergence speed S expressed by following formula (13). A normal determination error not due to a lack of the features converges to an average value in accordance with a law of large numbers.

$$S = \exp(-0.005204\ n) \qquad (13)$$

The measurability function is indicated by formula (14) described below.

$$c(\lambda) := \lim_{n \to \infty} \frac{1}{n} \log E(e^{\lambda S_n}) \qquad (14)$$

3. Example of Function Configuration Provided in Learning Device

Figure 2:
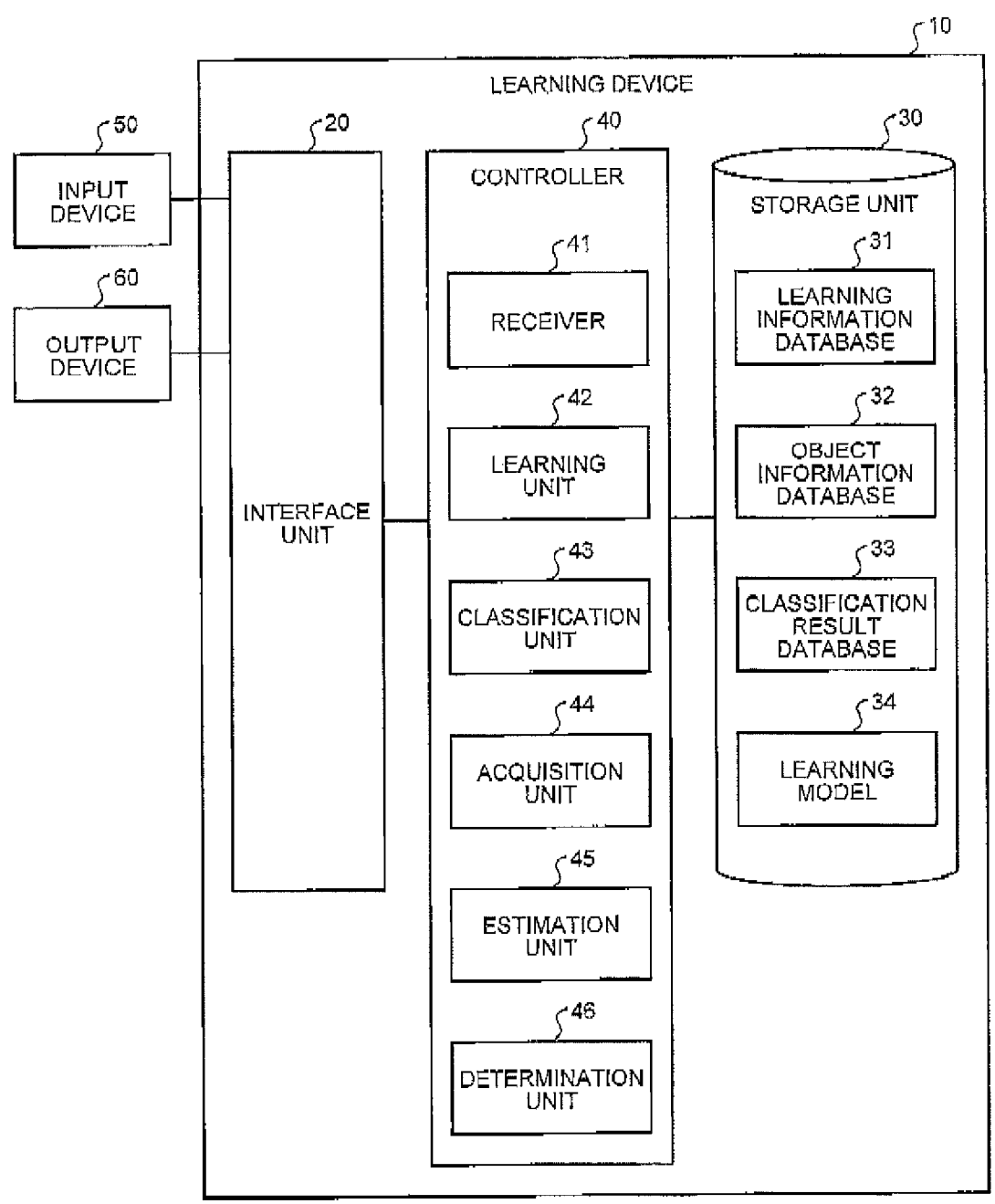
FIG. 2 is a diagram illustrating an example of a function configuration provided in an learning device 10 according to the embodiment.

Next, an example of a function configuration provided in the learning device 10 according to the embodiment will be described with reference to FIG. 2. FIG. 2 is a diagram illustrating an example of a function configuration provided in an learning device 10 according to the embodiment. As illustrated in FIG. 2, the learning device 10 includes an interface unit 20, a storage unit 30, and a controller 40. Additionally, in the example illustrated in FIG. 2, the learning device 10 is connected to an input device 50 and an output device 60 through the interface unit 20.

The input device 50 is a device for inputting various types of information to the learning device 10 and, for example, realized by an input device such as a mouse, a keyboard, a touch panel, or a microphone, and a reading device that reads information from a certain recording medium such as a flash memory or a compact disc read only memory (CD-ROM). For example, the input device 50 as described above is used to register the learning data and the data to be determined, to set a threshold, and to specify a new feature.

The output device 60 is a device for outputting a processing result according to the learning device 10 and, for example, realized by a monitor or a printer. For example, the output device 60 as described above outputs a determination result output according to the learning device 10, a message indicating whether a new feature is set as the object to be learned, and a screen for specifying a new feature.

The interface unit 20 is an interface that receives input from the input device 50. In addition, the interface unit 20 is an interface for outputting various types of information to the output device 60.

The storage unit 30 is realized by, for example, a semiconductor memory element such as a random access memory (RAM) or a flash memory, or alternatively, a storage device such as a hard disk or an optical disc. Additionally, the learning information database 31, the object information database 32, a classification result database 33, and a learning model 34 are registered in the storage unit 30.

Hereinafter, examples of information registered in the respective databases 31 to 33 stored in the storage unit 30 will be described with reference to FIG. 3 to FIG. 5.

First, an example of information registered in the learning information database 31 will be described with reference to FIG. 3. FIG. 3 is a diagram illustrating an example of information registered in the learning information database according to the embodiment. As illustrated in FIG. 3, the feature #1 and the feature #2 indicating the sex and the income, respectively, of the respective users a to d are registered in the learning information database 31 as the learning data. It is assumed that, in addition to the users a to d, the feature #1 and the feature #2 for other users satisfying a predetermined condition are also registered in the learning information database 31. Furthermore, any feature may be included in the learning information database 31 in addition to the feature #1 and the feature #2.

Here, data used as the correct data while the learner is learned is registered in the learning information database 31 as the learning data. For example, when the learner configured to classify the users into a group who "likes driving" and a group who "does not like driving" based on the feature #1 and the feature #2 is learned, the feature #1 and the feature #2 indicating attributes relating to the sex and the income of users classified to the group who "likes driving" are to be registered to the learning information database 31.

For example, in the example illustrated in FIG. 3, the feature #1 "a1" and the feature #2 "a2" of the user a are associated with one another to be registered in the learning information database 31. In the example illustrated in FIG. 3, conceptual values such as "a1" to "d1" and "a2" to "d2" have been noted as the feature #1 and the feature #2 for the respective users a to d but actually, flags and information indicating the feature #1 and the feature #2 are to be registered. For example, in a case where the feature #1 is a feature indicating the sex, "a1" to "d1" may be values such as "male" and "female".

Next, an example of information to be registered to the object information database 32 will be described with reference to FIG. 4. FIG. 4 is a diagram illustrating an example of information to be registered to the object information database according to the embodiment. In the example in FIG. 4, the feature #1 to the feature #3 for the respective users A to D are registered in the object information database 32 as the object information. It is assumed that, in addition to the users A to D, the feature #1 to the feature #3 for other users satisfying a predetermined condition are also registered in the object information database 32. Furthermore, any feature may be included in the object information database 32 in addition to the feature #1 to the feature #3.

For example, in the example illustrated in FIG. 4, the feature #1 "A1", the feature #2 "A2", and the feature #3 "A3" of the user A are associated with each other to be registered in the object information database 32. In the example illustrated in FIG. 4, conceptual values such as "A1" to "D1", "A2" to "D2", and "A3" to "D3" have been noted as the feature #1 to the feature #3 for the respective users A to D but actually, flags and information indicating the feature #1 to the feature #3 are to be registered.

Next, an example of information to be registered to the classification result database 33 will be described with reference to FIG. 5. FIG. 5 is a diagram illustrating an example of information to be registered to the classification result database according to the embodiment. In the example illustrated in FIG. 5, the classification results for the users A to D whose features have been included in the data to be determined are associated with information indicating the correctness of the classification results to be registered in the classification result database 33 as the classification results.

For example, the classification result database 33 registers a fact that the classification results obtained through the classification of the user A and the user B by the learner are "G1" and these classification results are "correct". In addition, the classification result database 33 registers a fact that the classification result obtained through the classification of the user C by the learner is "G1", the classification result obtained through the classification of the user D by the learner is "G2", and these classification results are "incorrect".

Figures 5, 6:
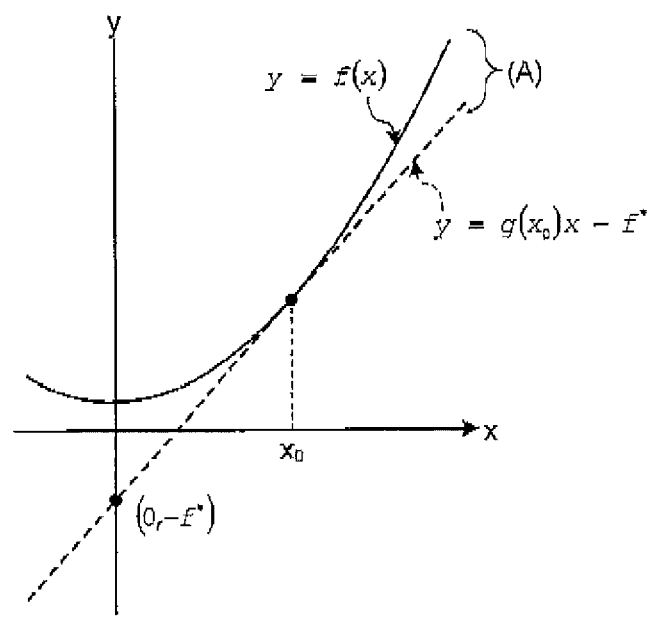
FIG. 5 is a diagram illustrating an example of information to be registered to a classification result database according to the embodiment.
FIG. 6 is a diagram for explaining an example of a rate function used by the learning device according to the embodiment.

In the example illustrated in FIG. 5, conceptual values such as "G1" and "G2" have been noted as the classification results for the respective users A to D. These values are information indicating respective groups classified by the learner, such as a group who "likes driving" and a group who "does not like driving".

The description will continue by referring back to FIG. 2. The learning model 34 is a learner that has been subjected to learning by using the learning data registered in the learning information database 31. For example, the learning model 34 is a learner that has learned the characteristics found in the feature #1 and the feature #2 for the users a to d. Based on the characteristics found in the feature #1 and the feature #2 among the data to be determined, which is registered in the object information database 32, the learning model 34 as described above classifies the respective users A to D into a group such as "G1" or "G2", for example.

The controller 40 is realized by a central processing unit (CPU), a micro processing unit (MPU), an application specific integrated circuit (ASIC), a field programmable gate array (FPGA), or the like that executes various programs stored in a storage device within the learning device 10 by using a RAM as a working area.

As illustrated in FIG. 2, the controller 40 includes a receiver 41, a learning unit 42, a classification unit 43, an acquisition unit 44, an estimation unit 45, and a determination unit 46.

The receiver 41 receives the learning data and the data to be determined. When receiving the learning data and the data to be determined from the input device 50, for example, the receiver 41 registers the learning data and the data to be determined that have been received to the learning information database 31 and the object information database 32, respectively.

The learning unit 42 learns the learning model 34 using the learning data registered in the learning information database 31. For example, the learning unit 42 generates, as the correct data, the learning model 34 that has learned the characteristics found in the feature #1 and the feature #2 included in the learning data registered in the learning information database 31. The learning model 34 as described above classifies the user A, for example, with respect to whether the user A belongs to the same group as that of the users a to d depending on the feature #1 and the feature #2 for the user A included in the data to be determined.

By using the learning model 34 configured to classify data based on a predetermined feature, the classification unit 43 classifies the data to be determined, which is registered in the object information database 32. Specifically, the classification unit 43 reads learning model 34 that has been learned by the learning unit 42 and uses the read learning model 34 to classify the data to be determined, which is registered in the object information database 32. Thereafter, the classification unit 43 registers the classification result to the classification result database 33.

For example, the classification unit 43 reads the feature #1 and the feature #2 for the user A from the object information database 32 and then uses the learning model 34 to determine which of "G1" and "G2" the user A is classified into. Thereafter, when the user A is determined to be classified into "G1", the classification unit 43 registers the classification result "G1" for the user A to the classification result database 33.

The acquisition unit 44 acquires the correctness of the classification result according to the classification unit 43. For example, the acquisition unit 44 refers to the classification result database 33 to acquire the classification results for the respective users A to D. In addition, the acquisition unit 44 presents the acquired classification results to the respective users A to D and requests entry of the correctness of the classification results. Thereafter, the acquisition unit 44 registers the entered correctness of the classification results to the classification result database 33.

Based on the large deviation principle, the estimation unit 45 estimates, from the classification results according to the classification unit 43, the behavior of the probability of a mistake-occurring in the classification results according to the classification unit 43. Specifically, based on the large deviation principle, the estimation unit 45 calculates the evaluation value P for evaluating the convergence of the probability distribution function in which the probability of a mistake occurring in the classification results is equal to or higher than a predetermined probability. Based on the large deviation principle, the estimation unit 45 also calculates the convergence speed S at which the probability distribution function in which the probability of a mistake occurring in the classification results is equal to or higher than a predetermined probability converges.

For example, the estimation unit 45 calculates the probability distribution P indicated in formula (3) based on the correctness registered in the classification result database 33 for the respective users A to D and then calculates the rate function I(x) indicated in formula (6) based on the probability distribution P that has been worked out. Thereafter, the estimation unit 45 calculates formula (11) based on the rate function I(x) and a threshold set by the administrator of the learning device 10, or the like, to calculate the evaluation value P indicated in formula (12) and the convergence speed S indicated in formula (13).

Here, FIG. 6 is a diagram for explaining an example of the rate function used by the learning device according to the embodiment. For example, a function which is tangent to a function "y=f(x)" at "x=$x_0$" on a function "y=f(x)" indicated by a solid line in FIG. 6 will be considered. Such a function is obtained as a function indicated by a dashed line in FIG. 6. This function can be expressed as "y=g($x_0$)x−f*" when a function obtained by differentiating an intercept with respect to "−f*" and "f(x)" with respect to "x" in a case where "x=0" is given in this function is assumed as "g(x)".

As indicated by (A) in FIG. 6, relative entropy serving as a difference depending on a value of x is generated between the function "y=f(x)" and the function "y=g($x_0$)x−f*" as described above. Such relative entropy is usable as a measure for forecasting a difference between two functions, that is, a measure for forecasting a difference between two probability distributions. Accordingly, the learning device 10 uses such relative entropy as the rate function I(x).

The description will continue by referring back to FIG. 2. Based on the behavior estimated by the estimation unit 45, the determination unit 46 determines whether to add a new feature to the object to be learned for the learning model 34. Specifically, the determination unit 46 acquires the values of the evaluation value P and the convergence speed S worked out by the estimation unit 45. Thereafter, when the value of the evaluation value P exceeds a predetermined threshold and the value of the convergence speed S is equal to or lower than a predetermined speed, the determination unit 46 adds a new feature to the object to be learned.

In a case where the value of the evaluation value P exceeds the predetermined threshold, the determination unit 46 may add a new feature to the object to be learned regardless of the value of the convergence speed S. Meanwhile, in a case where the value of the convergence speed S is equal to or lower than the predetermined speed, the determination unit 46 may add a new feature to the object to be learned regardless of the value of the evaluation value P. Additionally, the determination unit 46 may determine whether to add a new feature to the object to be learned depending on a combination of the value of the evaluation value P and the value of the convergence speed S.

Here, when it is determined that a new feature is added to the object to be learned, the determination unit 46 carries out the following processing. First, the determination unit 46 refers to the classification result database 33 to identify a user for which the classification result is "incorrect". Subsequently, the determination unit 46 refers to the object information database 32 to identify a feature not set as the object to be learned for the learning model 34 among features for the identified users. Thereafter, the determination unit 46 extracts a value of a feature common to the users for which the classification results are "incorrect" from among the identified features and registers the value of the extracted feature to the learning information database 31 as a new object to be learned. Specifically, among the data registered in the object information database 32, the determination unit 46 registers, to the learning information database 31 as a new object to be learned, a feature whose value is common to the users for which the classification results have been determined as being mistakes.

In such a case, the learning unit 42 learns the learning model 34 one more time by using the features registered in the learning information database 31, namely, the feature registered in advance and the feature newly registered. In such a case, the learning unit 42 registers the specified feature to the learning information database 31 as the correct data or incorrect data and, while relearning the learning model 34, uses the learning data registered in the learning information database 31, namely, the learning data used last time and the newly added data.

When the learning model 34 has been relearned as described above, the classification unit 43 uses the learning model 34 which has been relearned to classify the information to be determined, which is registered in the object information database 32, one more time. In addition, when the classification unit 43 has carried out the classification one more time, the acquisition unit 44 acquires one more time the correctness of the classification results obtained one more time. Thereafter, when the correctness of the classification results has been acquired one more time, the estimation unit 45 calculates the evaluation value P and the convergence speed S one more time based on the classification results of the reclassification. Subsequently, the determination unit 46 determines one more time whether to add a further new feature to the learning result depending on the values of the evaluation value P and the convergence speed S that have been worked out one more time.

The determination unit 46 may present, to the administrator, the values of the features for the users for which the classification results have been "incorrect" through the output device 60 to which these values are output, so as to register the value of the feature selected by the administrator to the learning information database 31 as a new object to be learned. Meanwhile, when a new object to be learned is not added, the determination unit 46 consequently outputs, from the output device 60, a message indicating that the learning of the learning model 34 has been completed.

4. Procedure for Processing Carried Out by Learning Device

Figure 7:
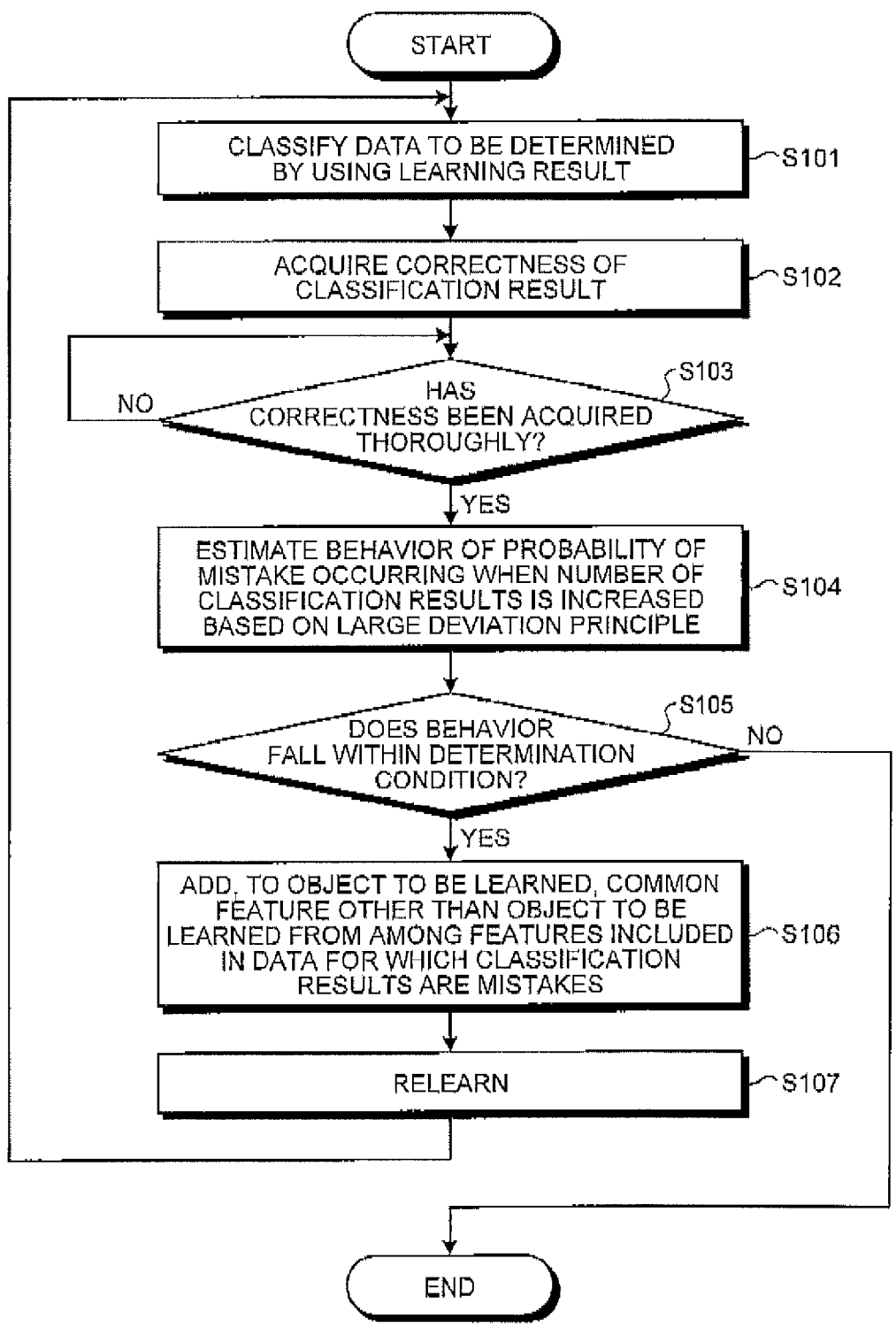
FIG. 7 is a flowchart for explaining an exemplary flow of processing carried out by the learning device according to the embodiment.

Next, a flow of processing carried out by the learning device 10 will be described with reference to FIG. 7. FIG. 7 is a flowchart for explaining an exemplary flow of processing carried out by the learning device according to the embodiment. For example, the learning device 10 classifies the data to be determined by using the learning result (step S101). Subsequently, the learning device 10 acquires the correctness of the classification results (step S102). Thereafter, the learning device 10 determines whether the correctness has been acquired for all of the classification results (step S103). When the correctness has not been acquired for all of the classification results (step S103: No), the learning device 10 stands by until all of the classification results have been acquired.

On the other hand, when the correctness has been thoroughly acquired (step S103: Yes), the learning device 10 estimates, based on the large deviation principle, the behavior of the probability of a mistake occurring when the number of the classification results is increased (step S104). Thereafter, depending on whether the value of the evaluation value P is larger than a predetermined threshold and whether the value of the convergence speed S is smaller than a predetermined threshold, the learning device 10 determines whether the probability of a mistake occurring when the number of the classification results is increased falls within a predetermined determination condition according to the thresholds (step S105). Specifically, the learning device 10 determines whether the behavior in the large deviation is due to a lack of the features.

Subsequently, when it is determined that the probability of the occurrence of mistake falls within the determination condition according to the thresholds (step S105: Yes), the learning device 10 adds, to the object to be learned, a feature not set as the object to be learned and common to the data for which the classification results are mistakes, from among features included in the data for which the classification results are mistakes (step S106). Thereafter, the learning device 10 relearns the learning model 34 (step S107) and carries out the processing one more time from step S101.

On the other hand, when it is determined that the probability of the occurrence of mistake does not fall within the determination condition according to the thresholds (step S105: No), that is, when the value of the evaluation value P is smaller than the predetermined threshold or when the value of the convergence speed S is larger than the predetermined threshold, and so forth, the learning device 10 terminates the processing without relearning.

5. Modifications

The learning device 10 according to the above-described embodiment can be carried out in various types of different modes in addition to the aforementioned embodiment. Accordingly, other embodiments of the aforementioned learning device 10 will be described hereinafter.

5-1. About Probability of Appearance of Mistake Data

The learning device 10 has calculated formula (1) to formula (13) described above on the assumption that the probability of the appearance of mistake data is one hundredth in a case where 1000 classification results are present. However, the embodiment is not limited thereto and the learning device 10 can set the probability of the appearance of mistake data to an arbitrary value. Accordingly, the probability of the appearance of mistake data can be set to an arbitrary value within a margin of error allowable for the learner.

5-2. About Addition of New Feature

The learning device 10 described above has determined whether to add a new feature depending on the values of the evaluation value P and the convergence speed S. However, the embodiment is not limited thereto. For example, in a case where the value of the evaluation value P is equal to or larger than the predetermined threshold, the learning device 10 may add a new feature to the object to be learned regardless of the value of the convergence speed S. The learning device 10 can employ arbitrary values as the threshold compared with the evaluation value P and the threshold compared with the convergence speed S.

Additionally, the above-described learning device 10 has carried out such machine learning that the feature included in the learning data and the feature newly added to the object to be learned are used as the correct data indicating positive examples. However, the embodiment is not limited thereto. For example, in addition to the correct data, the learning device 10 may also carry out the machine learning by using the incorrect data indicating negative examples. Furthermore, the learning device 10 has learned the learner configured to classify the users into two groups. However, the embodiment is not limited thereto. Accordingly, the learning device 10 may learn a learner configured to classify the users into the arbitrary number of groups.

Here, in the machine learning in which binary classification is learned, the positive example and the negative example serve as concepts representing one of binary numbers and the other thereof. The positive example and the negative example are names used for convenience for the purpose of the separation into the binary numbers and therefore, may relate to the content of the data to be learned or may not relate thereto. The positive example is noted as being correct, positive, true, or the like. The negative example is noted as being incorrect, negative, false, or the like. The content of the correct data and the incorrect data, terms relating thereto, and so forth are different for each of learning cases.

5-3. About Large Deviation Principle

Here, the large deviation principle has a plurality of variations. For example, the description above has mentioned an example of the processing using the large deviation principle according to Cramer. However, the embodiment is not limited thereto. For example, the variations of the large deviation principle include a large deviation principle of Donsker-Varadhan that evaluates an Anderson model representing the behavior of electrons in the random potential. The learning device 10 can apply, to the aforementioned processing, any of the variations of the large deviation principle such as the large deviation principle of Donsker-Varadhan described above to estimate the behavior of the probability of a mistake occurring when the number of the classification results is increased.

5-4. About Objects to be Applied

The learning device 10 described above has learned the learner configured to classify the users into a group who "likes driving" and a group who "does not like driving". However, the embodiment is not limited thereto. For example, the learning device 10 may learn a learner configured to classify a certain type of data such as certain measurement data and certain log data. Meanwhile, the learning device 10 can carry out any types of classifications including the classification relating to advertisement. For example, the learning device 10 may classify users based on whether users browse a predetermined advertisement or whether users click a predetermined advertisement. In addition, for example, the learning device 10 may classify users based on whether users purchase a predetermined product. As described above, the learning device 10 may be configured to be able to carry out the classification using the learner, which is achieved as a result of the aforementioned processing, by combining the classification with advertisement delivery, product recommendation, or the like.

5-5. About Identification of Feature to be Added

The learning device 10 described above has newly added, to the object to be learned, the feature for the users for which the classification results are mistakes. Here, the learning device 10 may identify a feature to be newly added to the object to be learned depending on the behavior of the probability of a mistake occurring when the number of the classification results is increased by using the large deviation principle. For example, the learning device 10 compares a value of the probability of a mistake occurring when the number of the classification results is increased by using the large deviation principle at a time point when a new object to be learned is added, and a value of the probability of a mistake occurring when the number of the classification results is increased by using the large deviation principle at a time point before a new object to be learned is added. Thereafter, as a result of the comparison, when the value of the probability of the occurrence of mistake is not reduced by a predetermined threshold or larger, the learning device 10 may exclude the feature added to the object to be learned last time from the object to be learned and add another feature as a new object to be learned.

Additionally, the learning device 10 may compare the values of the evaluation value P and the convergence speed S that were worked out last time and the values of the evaluation value P and the convergence speed S that have been newly worked out. When the values of the evaluation value P and the convergence speed S are not improved, such as a case where the value of the evaluation value P is not decreased or a case where the value of the convergence speed S is decreased, the learning device 10 may exclude the feature added to the object to be learned last time from the object to be learned and add another feature as a new object to be learned. In other words, the learning device 10 may apply the large deviation principle to not only the determination on whether to add a new feature but also the selection of a feature to be added.

5-6. Hardware Configuration

Figure 8:
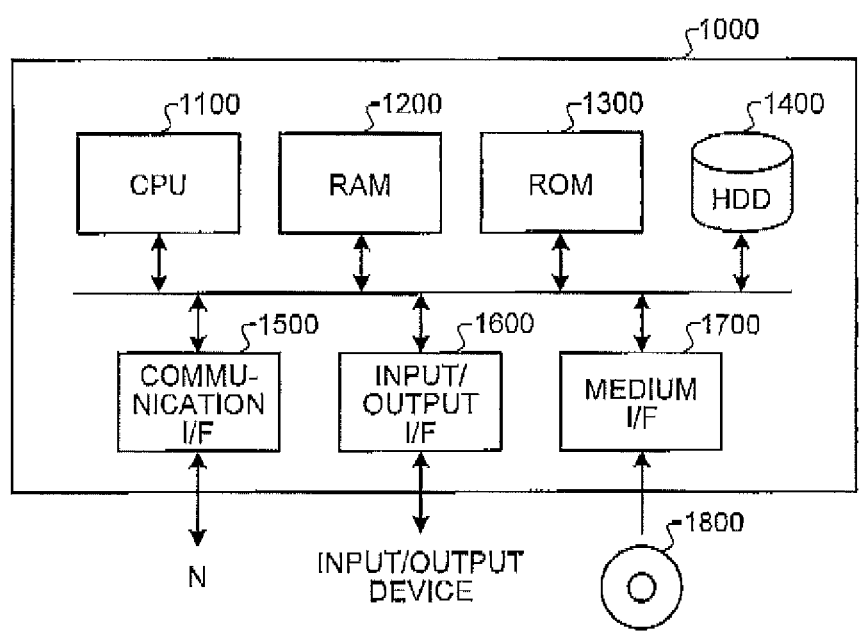
FIG. 8 is a diagram illustrating an exemplary hardware configuration of a computer that realizes a function of the learning device.

Furthermore, the learning device 10 according to the embodiments described thus far is realized by a computer 1000, for example, configured as illustrated in FIG. 8. FIG. 8 is a diagram illustrating an exemplary hardware configuration of a computer that realizes a function of the learning device. The computer 1000 includes a CPU 1100, a RAM 1200, a ROM 1300, an HDD 1400, a communication interface (I/F) 1500, an input/output interface (I/F) 1600, and a medium interface (I/F) 1700.

The CPU 1100 works based on a program stored in the ROM 1300 or the HDD 1400 to control respective constituent members. The ROM 1300 stores a boot program executed by the CPU 1100 at the startup of the computer 1000, a program that depends on the hardware of the computer 1000, and the like.

The HDD 1400 stores a program executed by the CPU 1100 along with data used by this program, and the like. The communication interface 1500 receives data from another apparatus through a communication network 500 (corresponding to a network N) to send to the CPU 1100 and transmits data generated by the CPU 1100 to another apparatus through the communication network 500. The CPU 1100 controls output devices such as a display and a printer and input devices such as a keyboard and a mouse through the input/output interface 1600. The CPU 1100 acquires data from the input device through the input/output interface 1600. In addition, the CPU 1100 outputs the generated data to the output device through the input/output interface 1600.

The medium interface 1700 reads a program or data stored in a recording medium 1800 to provide to the CPU 1100 through the RAM 1200. The CPU 1100 loads this program to the RAM 1200 from the recording medium 1800 through the medium interface 1700 and executes the loaded program. Examples of the recording medium 1800 include an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the learning device 10, the CPU 100 of the computer 1000 executes the program loaded on the RAM 1200, thereby realizing the function of the controller 40. Meanwhile, the HDD 1400 stores respective types of data within the storage unit 30. The CPU 1100 of the computer 1000 reads these programs from the recording medium 1800 to execute but in another example, these programs may be acquired from another device through the communication network 500.

6. Effects

As described above, by using the learner configured to classify data to be determined based on a predetermined feature among the features included in the data to be determined, the learning device 10 classifies the data to be determined. In addition, based on the large deviation principle, the learning device 10 estimates, from the actual classification results, the behavior of the probability of a mistake occurring in the classification results. Thereafter, based on the estimated behavior, the learning device 10 determines whether to add a new feature to the object to be learned for the learner. Accordingly, the learning device 10 can enhance the classification accuracy according to the learner in a bootstrap manner, whereby missing features can be thoroughly extracted and added while this approach is repeatedly carried out. Meanwhile, a situation of a mistake occurring due to a lack of the features is linked with the large deviation, thereby creating a situation distinguished from a usual determination error which converges to an average value. As a result, the over-learning can be also prevented.

Furthermore, the learning device 10 calculates the evaluation value P for evaluating the behavior of the convergence based on the large deviation principle and, when the evaluation value P exceeds the predetermined threshold, adds a new feature to the object to be learned for the learner. As a result, when the probability of a mistake occurring in the classification results when the number of the classification results is increased falls within the determination condition according to the thresholds, the learning device 10 adds a new feature. Consequently, the learning device 10 can enhance the classification accuracy while preventing the over-learning.

Meanwhile, when the probability of a mistake occurring in the classification results falls within a predetermine margin in a rate function and a speed at which this rate function converges is equal to or lower than a predetermined speed based on the large deviation principle, the learning device 10 adds a new feature to the object to be learned. Consequently, the learning device 10 can enhance the classification accuracy while preventing the over-learning.

Additionally, when it is determined that a new feature is added to the object to be learned for the learner, the learning device 10 learns one more time the learner configured to classify the data based on the new feature and the predetermined feature. More specifically, among the features included in the data to be determined, for which the classification results have been mistakes, the learning device 10 uses a feature having a common characteristic as a new feature when learning the learner one more time. Consequently, the learning device 10 can enhance the classification accuracy of the learner.

In addition, by using the learner that has been learned one more time, the learning device 10 classifies the data to be determined one more time and, based on the classification results obtained one more time, estimates one more time the behavior of the probability of a mistake occurring when the number of the classification results is increased. Thereafter, based on the behavior that has been estimated one more time, the learning device 10 determines one more time whether to add a further new feature to the learning result of the learner. Therefore, the learning device 10 can enhance the classification accuracy according to the learner in a bootstrap manner.

Some of the embodiments according to the present application have been described thus far in detail with reference to the drawings. Note that these embodiments merely serve as examples and the present invention can be carried out in another mode subjected to various modifications and improvements based on the knowledge of those skilled in the art as well as the modes described in the section of the disclosure of the invention.

Additionally, "section", "module" and "unit" described above can be read as "means", "circuit", and the like. For example, the classification unit can be read as a classification means and a classification circuit.

According to an aspect of an embodiment, an effect that can enhance the classification accuracy of data is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A learning device comprising:
a classification unit that classifies data to be determined by using a learner configured to classify data based on a predetermined feature among features included in the data;
an estimation unit that estimates, from classification results according to the classification unit, the behavior of the probability of a mistake occurring in the classification results according to the classification unit based on a large deviation principle; and
a determination unit that determines, based on the behavior estimated by the estimation unit, whether to add a new feature to an object to be learned for the learner.

2. The learning device according to claim 1, wherein
the estimation unit calculates, based on the large deviation principle, a value that evaluates the convergence of a probability distribution function in which the probability of a mistake occurring in the classification results according to the classification unit falls within a predetermined margin, and
when the value calculated by the estimation unit exceeds a predetermined threshold, the determination unit adds the new feature to the object to be learned for the learner.

3. The learning device according to claim 2, wherein
the estimation unit calculates, based on the large deviation principle, a speed at which a rate function in which the probability of a mistake occurring in the classification results according to the classification unit falls within a predetermined margin converges, and
when the speed worked out by the estimation unit is equal to or lower than a predetermined speed, the determination unit adds the new feature to the object to be learned for the learner.

4. The learning device according to claim 1, comprising:
a learning unit that learns the learner configured to classify the data based on the new feature and the predetermined feature when the determination unit determines that the new feature is added to the object to be learned for the learner.

5. The learning device according to claim 4, wherein
among the features included in the data to be determined, for which the classification results according to the classification unit have been mistakes, the learning unit uses a feature having a common characteristic as the new feature when learning the learner.

6. The learning device according to claim 4, wherein
the classification unit classifies the data to be determined one more time by using the learner that has been learned by the learning unit,
the estimation unit estimates one more time, from the classification results obtained one more time according to the classification unit, the behavior of the probability of a mistake occurring when the number of the classification results according to the classification unit is increased, and
the determination unit determines one more time, based on the behavior estimated one more time by the estimation unit, whether to add a further new feature to a learning result of the learner.

7. A learning method comprising:
classifying data to be determined by using a learner configured to classify data based on a predetermined feature among features included in the data;
estimating, from classification results according to the classifying, the behavior of the probability of a mistake occurring in the classification results according to the classifying based on a large deviation principle; and
determining, based on the behavior estimated through the estimating, whether to add a new feature to an object to be learned for the learner.

8. A non-transitory computer readable storage medium having stored therein a learning program causing a computer to execute a process comprising:
classifying data to be determined by using a learner configured to classify data based on a predetermined feature among features included in the data;
estimating, from classification results according to the classifying, the behavior of the probability of a mistake occurring in the classification results according to the classifying based on a large deviation principle; and
determining, based on the behavior estimated through the estimating, whether to add a new feature to an object to be learned for the learner.

* * * * *